No. 850,710. PATENTED APR. 16, 1907.
L. WOJIDKOW.
PERCOLATOR.
APPLICATION FILED JULY 7, 1906.
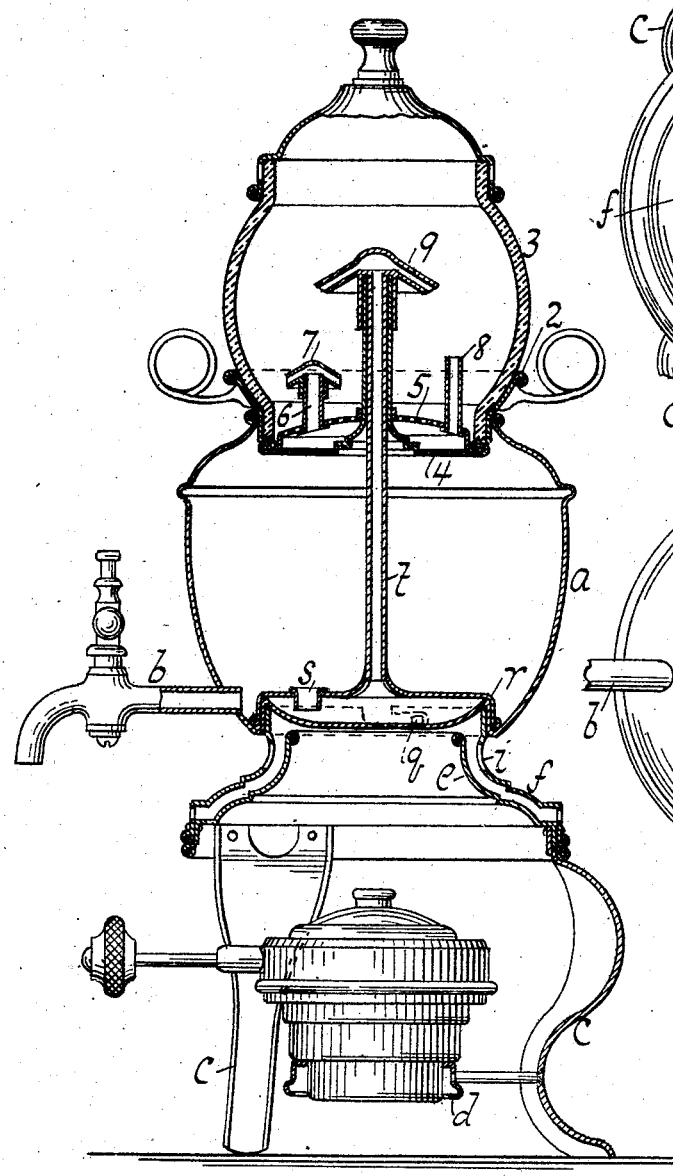
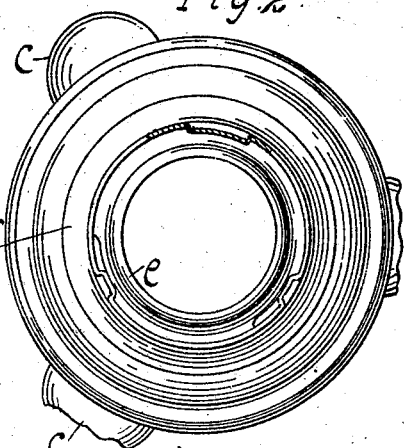
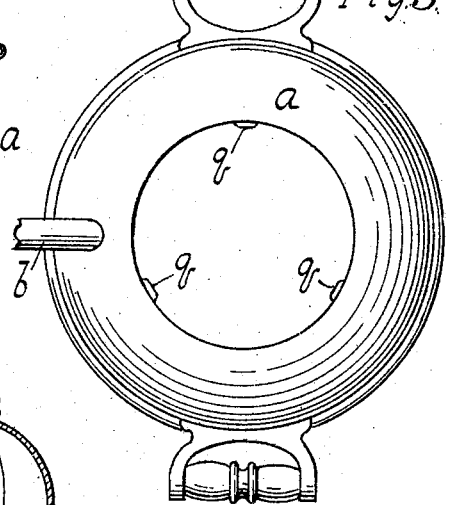
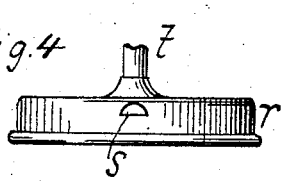
WITNESSES:
William Miller
George Hulsberg
INVENTOR
Louis Wojidkow
BY
W. C. Hauff
ATTORNEY

UNITED STATES PATENT OFFICE.

LOUIS WOJIDKOW, OF BROOKLYN, NEW YORK, ASSIGNOR TO THE NEW YORK STAMPING CO., OF BROOKLYN, NEW YORK, A CORPORATION OF NEW YORK.

PERCOLATOR.

No. 850,710.  Specification of Letters Patent.  Patented April 16, 1907.

Application filed July 7, 1906. Serial No. 325,139.

*To all whom it may concern:*

Be it known that I, LOUIS WOJIDKOW, a citizen of the United States, residing at Brooklyn, in the county of Kings and State of New York, have invented new and useful Improvements in Percolators, of which the following is a specification.

This invention relates to percolators or vessels adapted for making coffee or beverages.

This invention resides in certain features of construction set forth in the following specification and claims, and illustrated in the annexed drawings, in which—

Figure 1 is a sectional elevation of a percolator embodying this invention. Fig. 2 is a top view of the stand of Fig. 1 without the reservoir. Fig. 3 is a bottom view of the reservoir dismounted or taken off the stand. Fig. 4 shows a detail view of the cap.

In the drawings is shown a percolator comprising a reservoir or liquid-holder $a$. Various parts—such as the faucet or outlet $b$ or the circulating tube or strainer—are well known and need no description at this place.

A standard is shown comprising legs $c$, with a lamp-support $d$ and a double wall $e\,f$. The outer wall $f$ is adapted to act as a base to receive or seat the bottom portion or heating part of the reservoir $a$. The inner wall directs heat or flame from the lamp against the bottom of the reservoir.

The outer wall has circulating-openings or air-holes $i$ above and below. The walls $e\,f$ being spaced, air enters the lower holes $i$ and leaves at the upper, passing in the space between the walls. The outer wall being suitably cooled by the circulation, the reservoir or its outside is guarded against flame or excessive heating, so as not to tarnish or be defaced.

The outer wall forms a base or supporting portion for the reservoir placed thereon. The percolator and standard are separate, but can be connected, if desired, by suitable means.

In Fig. 1 is shown a cap $r$, forming a heating-chamber and having an outlet $t$ and inlet $s$. This inlet can be on the top, Fig. 1, or in the side of the cap, Fig. 4.

The reservoir $a$ sits over the outer standwall or clasps the same and connects thereto by a bayonet-joint connection comprising lugs $q$ on the flange or offset formed by the recessed bottom of the urn or reservoir and depressions or dents in the outer wall of the stand. The lugs $q$ are seen in Fig. 3, which is a bottom view of the reservoir dismounted, while Fig. 2 is a top view of the stand without the reservoir.

In Fig. 1 the holder 2 of the globe 3 has the usual strainer or foraminated bottom 4. On this strainer sits another strainer 5. The two strainers are not in contact with one another, but a chamber or air-space therebetween is provided for. The upper strainer is preferably coarser than the lower. The grounds being deposited on the upper strainer prevent such grounds from stopping or forming a pap on the fine meshes of the lower strainer. The upper strainer also has an overflow-tube 6, which has its mouth below the level of the globe-holder 2 and prevents water or liquid rising so high as to overflow the globe-holder. The overflow-tube has a removable cap 7, which will prevent grounds when being poured on the upper strainer from dropping through the lower. The strainer 5 is also shown with a pressure-escape tube 8, preferably higher than the overflow-tube and which can also have a cap, if desired. The removable cap 9, forming a sprinkler, can be taken off when desired to allow the strainer 5 to be slipped or raised out of place and replaced as desired.

The tubes 6 and 8, it may be noted, are not a necessary part of the device, but have been found practical.

The wall $e$ by having no lateral openings will not allow the flame to be blown sidewise, but will direct the flame to the bottom of the urn or reservoir $a$. This wall $e$, as also the wall $f$, are shown secured or riveted at their lower parts or edge portions to the legs $c$. Common rivets can be employed to secure both walls to the legs.

I claim—

1. A percolator and a standard therefor, said standard comprising legs, a wall secured to the legs and a second wall made to surround and secured to the inner wall, said inner wall being made to direct a flame or heat, and the outer wall being made to detachably support the percolator.

2. A percolator and a standard, the said standard comprising legs, a wall secured to the legs, and a second wall secured to the lower part of the first wall and made to surround such first wall to leave an annular space between the two, said outer wall being made to detachably engage the percolator, and the inner wall being made to extend up to near the bottom of the percolator to direct heat thereagainst.

In testimony whereof I have hereunto set my hand in the presence of two subscribing witnesses.

LOUIS WOJIDKOW.

Witnesses:
 GEORGE HULSBERG,
 W. C. HAUFF.